Figure 1:
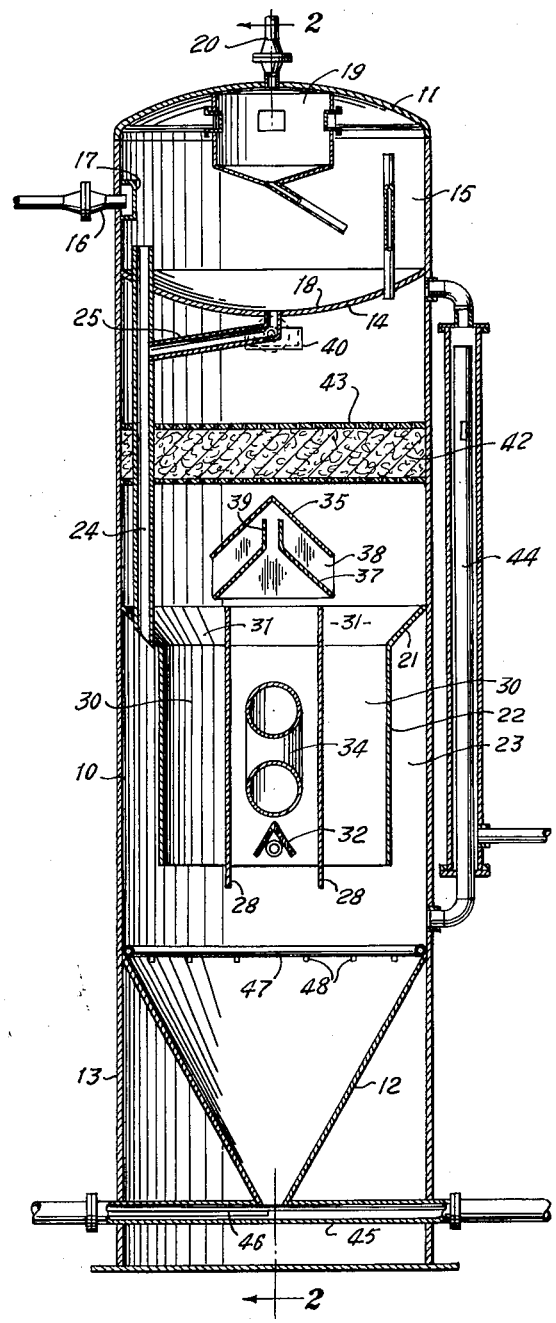

April 30, 1963    C. O. GLASGOW    3,087,292
EMULSION TREATING MEANS
Filed March 3, 1958    2 Sheets-Sheet 1

INVENTOR
Clarence O. Glasgow
BY
ATTORNEYS

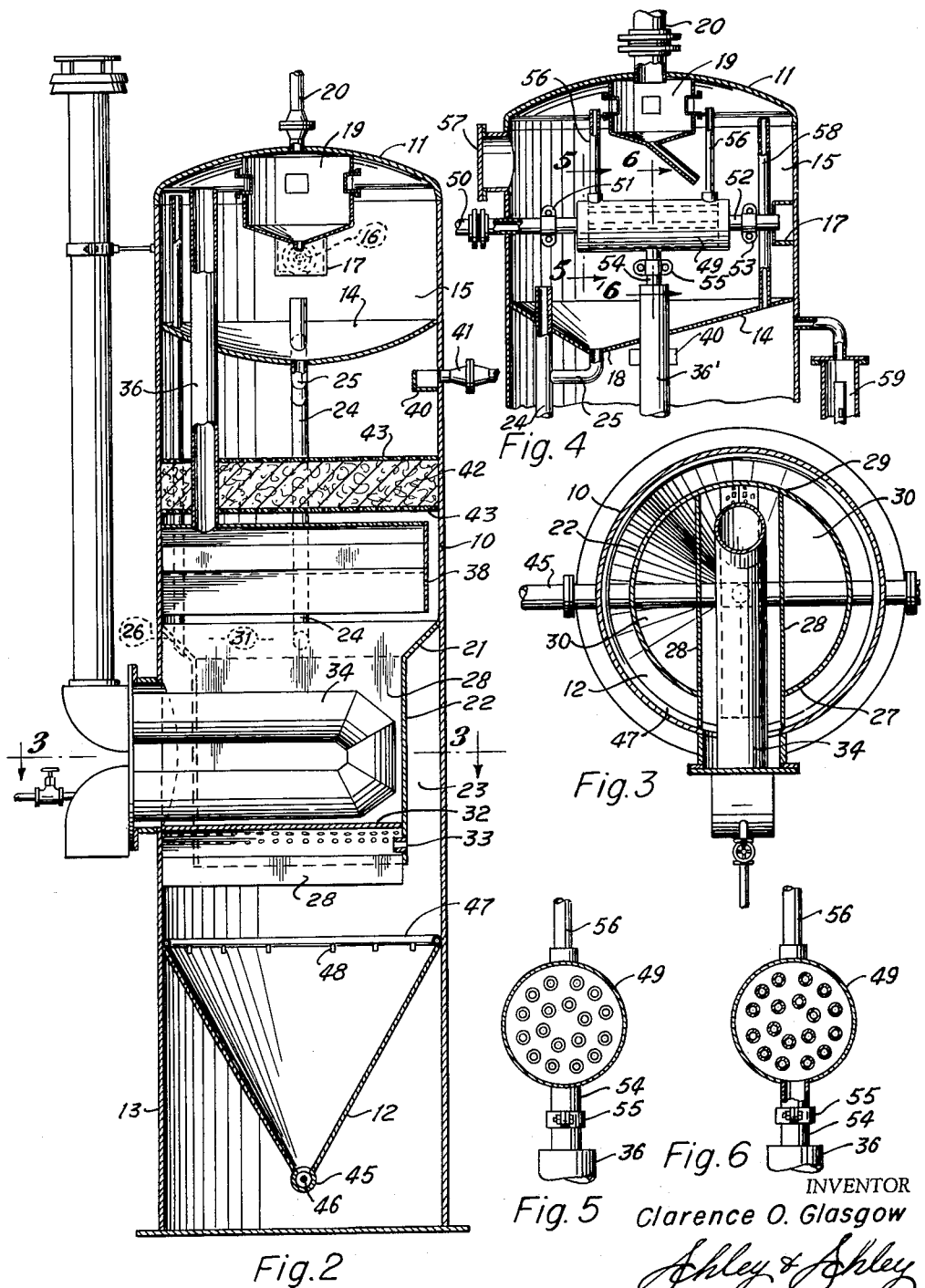

United States Patent Office 3,087,292
Patented Apr. 30, 1963

3,087,292
EMULSION TREATING MEANS
Clarence O. Glasgow, Tulsa, Okla., assignor to National Tank Company, Tulsa, Okla., a corporation of Nevada
Filed Mar. 3, 1958, Ser. No. 718,825
3 Claims. (Cl. 55—175)

This invention relates to new and useful improvements in means for treating emulsified well streams containing sand or other foreign matter.

The invention is directed in particular to emulsion treaters and especially adapted to the handling of well streams containing quantities of emulsified oil and also containing quantities of solid foreign material which will normally be sand flowing from the producing formation along with the well stream. The invention is also particularly adapted to the resolving of emulsions in well streams containing large quantities of water in either the free or emulsion-bound states.

There are types of petroleum wells which, during some stage of their productive life, or possibly throughout their productive life, produce well streams containing quantities of foreign material, such as sand, and may also produce considerable quantities of water along with the petroleum fluids. In many cases, at least a portion of the oil which is present may be loosely or more or less tightly bound into an oil and water emulsion resulting in the necessity of passing the well stream through an emulsion treater for resolution of the emulsified portion of the well stream into its water and clean oil components. Manifestly, where quantities of foreign matter such as sand are present in the well stream, there arises the problem of settling and accumulation of sand or other material in the emulsion treater, creating the necessity for periodic cleaning of the emulsion treater, an operation that normally requires that the treater be placed out of operation during the cleaning process. This not only results in temporary loss of the use of the emulsion treater, but also involves a considerable labor expense.

It is, therefore, a principal object of this invention to provide improved emulsion treating means wherein provision is made for removal of accumulated sand or other material without interruption of treating of the emulsion so as to provide for continuous processing of the well stream and effective resolution of the emulsified portions thereof.

An additional object of the invention is to provide an improved emulsion treater for well streams in which all horizontal surfaces are eliminated, there being employed only vertical or inclined partitions, walls, and other elements within the treating vessel whereby the effective settling of sand or other foreign material to the lower portion of the emulsion treater for ready removal is encouraged and effectively carried out.

A still further object of the invention is to provide improved means for treating well streams having emulsified portions and also containing foreign material such as sand, in which provision is made for approximately continuous withdrawal of separated water along with sand and other foreign material settling from the water and the well stream, whereby the accumulation of any appreciable quantity of foreign material within the treating zone is avoided, the foreign material being removed substantially at the rate at which it is introduced.

Yet another object of the invention is to provide improved means for treating well streams containing emulsified portions and foreign materials such as sand in which the well stream is carried first through a preliminary gas separation step followed by draining from the preliminary gas separation zone, and in which, in the event of clogging or obstruction of the drain from the separation zone by accumulation of sand or other foreign material, there are provided alternate routes of escape for the liquid portions of the well stream in order to eliminate the possibility that such liquid portions may be discharged through the gas outlet from the preliminary separation zone and thus lost to recovery.

Still another object of the invention is to provide improved means for the treatment of emulsified well streams containing sand or other foreign material in which the flowing velocity of the well stream is reduced to a very low level, and the well stream held in a substantially quiescent preheating or retention zone for a prolonged period prior to introduction of the well stream into the heating zone for resolution of the emulsion, whereby optimum quantities of free water and foreign material may settle from the well stream resulting in the removal of the sand or foreign material at the earliest possible point and avoiding the unnecessary heating of water which readily separates and settles from the accumulated body of well stream fluids.

An additional object of the invention is to provide improved means for treating emulsified well fluids containing foreign material such as sand in which the well stream is temporarily trapped following the heating step to enhance and encourage the settling of water and sand therefrom, and in which zone evolved vapors are drawn off from the treating zone to maintain the latter as turbulent-free as possible and to encourage and enhance both the settling of water from the emulsified portions of the well stream as well as the settling of sand or other foreign material therefrom.

Yet another object of the invention is to provide improved means of the character described in which the evolved vapors are conducted to a novel condensing structure for the condensation of an optimum quantity of recoverable liquid hydrocarbons, the condensing structure being readily disconnectable and removable from the treating structure for cleaning or for such other operations as may become necessary or desirable.

Still another object of the invention is to provide improved means for the treating of emulsified well streams having unique and effective provisions for the circulation of well fluids in the heating zone for more efficient use of the applied heat as well as more effective resolution of the emulsified portions of the well stream into their water and clean oil components.

A construction designed to carry out the invention will be hereinafter described, together with other features of the invention.

Figure 7:
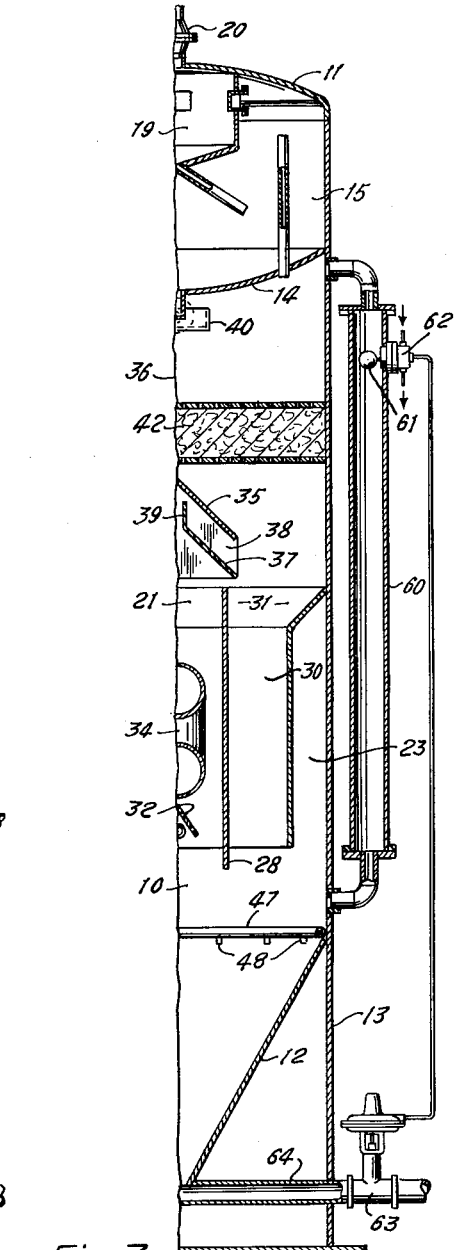

The invention will be more readily understood from a reading of the following specification and by reference to the accompanying drawings, wherein examples of the invention are shown, and wherein:

FIG. 1 is a vertical sectional view of an emulsion treater constructed in accordance with this invention and adapted to carry out the methods hereof, FIG. 2 is a vertical, sectional view taken at right angles to FIG. 1 upon the line 2—2 thereof, FIG. 3 is a horizontal, cross-sectional view taken upon the line 3—3 of FIG. 2, FIG. 4 is a vertical, sectional view of the upper portion of a modified form of the emulsion treater, FIGS. 5 and 6 are vertical, sectional views taken upon the respective lines of FIG. 4, and FIG. 7 is a fragmentary, vertical, sectional view illustrating a modification of the means for controlling the withdrawing of separated water from the emulsion treater structure.

In the drawings, the numeral 10 designates an upright cylindrical vessel having a domed upper end or head 11 and a conical bottom 12 with rather steeply inclined walls, the vessel being carried upon a cylindrical support or base member 13 forming a continuation of the outer walls of the vessel 10. In the upper portion of the vessel there is provided a transverse partition 14 enclosing in the upper end of the vessel a preliminary gas separation chamber 15 having a well stream inlet conductor 16 opening into the separation chamber through a diverter box 17. The partition 14 is dished or concave in configuration, all portions of the partition being inclined smoothly downwardly so that all liquids, foreign material such as sand, and the like, are caused to flow or move downwardly over the upper surface of the partition 14 to the lowest point thereof which is disposed centrally of the vessel 10. In other forms of the invention, as illustrated in FIG. 4, the partition 14 may be made approximately conical with an off-center, depending inverted apex 18 forming the lowest part of the partition.

The incoming well stream is spread by the diverter box 17 and caused to flow in a thin layer through a circumferential path about the walls of the preliminary gas separation chamber 15 whereby quantities of gas are separated from the well stream and small bubbles of gas encouraged to break through the surface of the thinly spread oil layer. The separated gas is withdrawn through a mist extractor 19 and gas outlet pipe 20 while, as stated above, the separated liquids and any foreign material which may be present settle by gravity upon the partition 14. It is to be noted that the separated liquids are comparatively cool as compared to other liquids and vapors present within the emulsion treating structure and that the chamber 15, along with the partition 14, is maintained relatively cool.

In the intermediate portion of the vessel 10, there is provided a second partition 21 of inverted and truncated conical shape, the upper wall of the partition being inclined downwardly toward a central aperture from which depends a cylindrical skirt 22. The partition 21 and skirt 22 enclose an annular retention space or chamber 23 to which an emulsion stream downcomer or flume 24 leads from the chamber 15 at an elevation spaced above the partition 14. Under normal operating conditions, the liquids separated in the chamber 15 are drained from the lowermost point of the partition 14 by a branch conductor 25 leading from said lowermost point into the flume 24, but upon occasion, as will be explained more fully hereinafter, liquids may accumulate within the chamber 15 to such an extent as to overflow the upper end of the flume 24 which projects above the partition 14, and hence, an alternate escape route for such liquids into the flume 24 is provided.

The partition 21 has a portion thereof cut away as indicated at 26 in FIG. 2, and the skirt 22 has a corresponding portion cut away as indicated at 27 in FIG. 3 to receive a pair of spaced, vertical partition plates 28 extending from the side wall of the vessel 10 through the cut-out portions of the partition 21 and skirt 22 and adjoining the internal wall of the skirt 22 at the side opposite the cut-out portion 27 as indicated at 29. Thus, the plates or partitions 28 define a vertically disposed heating space of considerable height and extending a major portion of the distance across the vessel 10. There are also defined lateral liquid flow spaces 30 upon each side of this heating space between the partitions 28 and the walls of the skirt 22. As shown in FIG. 2, the upper edges of the partitions 28 extend above the upper end of the skirt 22 and thus form with portions of the partition funnel-like spaces 31 opening downwardly by the sides of the heating space into the lowermost portion of the treating vessel.

In the lower portion of the heating space between the partitions 28, a perforated emulsion stream distributor 32 is positioned, the distributor being of any suitable or desirable type or design and extending transversely of the vessel 10 substantially throughout the length of the heating space. A short conductor 33 opens into the interior of the distributor through the lower portion of the skirt 22 so that the accumulated emulsion stream may flow from the lower portion of the annulus 23 into the distributor for upward flow through the heating space. A return bend fire tube 34, or any other suitable or desirable type of heating unit, is positioned between the partitions 28 above the distributor 32 so that as the emulsion stream flows upwardly thereover, it will be heated to the proper temperature for breaking and resolving the emulsion components of the well stream into their water and clean oil components. Of course, the entire treating structure is normally filled with heated liquids to a point closely beneath the partition 14, and consequently, the entire retention chamber, heating space and heating unit which have been described will most often be immersed in liquids heated to a greater or lesser degree.

The separated liquid portions of the well stream, along with any sand or other foreign material which may be present, flow downwardly through the conductor 25 and flume 24 into the upper portion of the annulus 23 wherein the speed of travel of these liquid portions is materially reduced, and wherein the liquids are subjected to a quite marked degree of heating due to the adjacency of the heating unit 34 and also due to the fact that the entire area is filled with warm or heated liquids. This preliminary heating of the downwardly flowing emulsion stream will result in the breaking of considerable portions of the looser emulsions which may be present whereby the subsequent heating of the emulsion stream is reserved largely for the tighter emulsions or those portions of the emulsion stream more difficult to break or resolve, the free water and water separated within the annulus 23 flowing downwardly therefrom, due to their greater weight, into the bottom or lower portion of the emulsion treater. The warming or preliminary heating of the emulsion stream will also materially reduce the viscosity of the liquids of which the emulsion stream is composed, and especially, the petroleum portions thereof, whereby the settling of sand and other foreign matter from the emulsion stream is facilitated and the major portion, if not substantially all, of the foreign material is thus settled into the cone-shaped bottom 12 of the treating vessel.

The emulsified portions of the well stream will, of course, accumulate within the annulus 23 and move slowly downwardly to the elevation of the outlet 33 from which the emulsion flows into the distributor 32 and upwardly around the fire tube 34 between the plates 28. Because the liquids are thus brought to a higher temperature than the surrounding liquids, they inherently flow upwardly into the space above the partition 21, the separated water, as it cools, flowing downwardly through the spaces 30 whereby a continuous circulation of liquids is achieved for more effective heating of the emulsion stream, and whereby some conservation of heat input is realized since the upward induction created by the heated and upwardly flowing emulsion stream is largely satisfied by the descending separated water which is at a temperature not greatly below that to which the emulsion stream is heated.

There is often some evolution of gases and vapors in the vicinity of the heating unit 34, and there is also the creation of a degree of turbulence due to the upward thrust of the heated liquids. For trapping these gases and vapors, as well as slowing the upward flow of heated liquids, there is provided above the heating unit 34 a pair of spaced baffles of inverted V-shaped cross-section or of approximately triangular prismatic shape, the upper baffle 35 opening into the lower end of a gas flume 36 extending upwardly into the chamber 15 through the partition 14, and the lower cone-shaped baffle 37 being spaced below and depending from the baffle 35 upon a suitable end plate 38. The baffle 37 is formed with an outlet 39 in its apex for releasing gases and liquids upwardly into the interior of the baffle 35, there possibly being some spill over of liquids from beneath the lower edge of the baffle 37, but, in most cases, all of the fluids entering the baffle 37 being discharged through the outlet 39 into the baffle 35. The evolved gases and vapors will, of course, travel upwardly into the chamber 15, condensation of both water and hydrocarbon vapors occurring throughout the length of the flume 36, and especially in the portion thereof projecting into the chamber 15, which, like the partition 14, is constantly bathed with the incoming well stream and maintained relatively cool thereby.

The upward thrust of the heated liquids will largely be absorbed and dissipated by the cones 35 and 37, the liquids discharging or overflowing from beneath the lower edge of the baffle 35 to continue their upward flow within the interior of the treating vessel 10, but at a much more moderate rate and much more free of turbulence. Having been heated to the necessary or proper treating temperature, the liquids will, upon entering the large and quiet stratification zone constituted by the portion of the vessel 10 above the baffle 35 and below the partition 14, break and resolve into water and clean oil components which stratify by gravity, the oil rising into the uppermost portion of the stratification chamber immediately beneath the partition 14 and being withdrawn through an overflow or weir box 40 communicating with a clean oil outlet 41. The separated water passes downwardly from the stratification zone, most usually into the flow passages 30, for discharge into the lower portion of the emulsion treating vessel. This slowing or temporary impeding of the heated well stream, along with the reduction of turbulence is also very important for settling the last traces of sand toward the lower end of the vessel 10.

There will also be gases and vapors evolved from the body of liquids present around and above the baffles 35 and 37, and in passing upwardly into contact with the underside of the relatively cool partition 14, further condensation or liquefaction of gases and vapors will occur, the condensed, light and valuable hydrocarbon liquids being returned into the clean oil layer for recovery with the withdrawn clean oil, this conservation of the lighter hydrocarbons both increasing the volume and the gravity of the clean oil and thus increasing the value thereof.

If desired, a coalescing bed or layer 42 of hay, wood excelsior, or other fibrous or porous material may be confined between perforated partitions 43 in the upper part of the vessel 10 above the partition 35 and in the lower portion of the stratification zone. Such material is effective in agglomerating separated oil particles, and is sometimes found desirable to use for this purpose. On the other hand, when sandy well streams are being treated, it is desirable, if possible, to omit the filtering or coalescing section 42 due to the tendency of sand to accumulate therein which results in the necessity of periodic removal and replacement of the fibrous material 42.

The separated water may be withdrawn from the vessel 10 at a point immediately above the cone-shaped bottom 12 by a conventional water siphon or water leg 44, while the separated sand settles into the cone-shaped or hopper-like bottom 12. For removal of this accumulated sand, a pipe 45 extends transversely of the supporting structure 13, the lowermost portion of the cone-shaped bottom 12 opening into the pipe 45, and there being provided interiorly of the pipe 45 a sand jet 46 through which air or gas under pressure, or steam, or other suitable gases or liquids may be passed under pressure and at high velocity in order to jet and aspirate the sand from the conical bottom 12 into the pipe 45 and thence exteriorly of the vessel for disposal. There may also be provided an annular manifold 47 around the upper edge of the cone-shaped bottom 12 carrying a plurality of nozzles or jetting units 48 for washing sand and foreign material down the side walls of the botom 12 for removal through the pipe 45.

In the operation of this first form of the invention, the well stream enters the preliminary gas separation chamber 15 through the inlet 16 and diverter box 17 whereby the stream is caused to flow circumferentially of the chamber 15 and to be spread into a relatively thin layer upon the walls thereof for scrubbing and evolution of free gas from the well stream. The separated emulsion and other liquids settle onto the partition 14 and pass downwardly through the conductor 25 and flume 24 into the annulus 23 wherein the separated liquid portions are subjected to a quite appreciable degree of preheating, and wherein there is also established a relatively large retention zone within which the separated liquids have a rather lengthy period of residence. As the liquids move downwardly for escape through the pipe 33, there will be a marked degree of separator or settling of free water along with the resolution of some of the looser emulsified portions of the well stream. A major portion of the sand or other foreign matter present in the liquids may also be expected to settle therefrom at this point.

Upon passing through the pipe 33, the liquids enter into the spreader 32 wherein they are divided into a multiplicity of relatively small upwardly flowing streams which impinge upon and around the heating unit 34 before passing upwardly to the inverted baffles 35 and 37. Water separating from the well stream, and especially the emulsified portions thereof, in the zone above the heating unit 34 tends to return downwardly through the passages 30 while vapors and gases are trapped by the baffle 35 and conducted upwardly through the pipe 36 into the chamber 15. At this point, the velocity of upward movement of the heated fluids is sharply reduced and convection currents broken up so that settling of sand and water from the fluids is encouraged due to the relatively quiet, turbulence-free condition into which the fluids are brought. It is to be noted that the upper portion of the pipe 36 projects into the chamber 15 above the partition 14, and that this projecting portion will constantly be bathed and maintained at a relatively cool temperature by the incoming emulsion stream. Consequently, there will be effective condensation of portions of the gases and vapors at this point as well as within the chamber 15, and in addition, any vapors arising from the surface of the warm clean oil immediately below the partition 14 will contact the underside of the partition and, to a considerable degree, be condensed thereon for return to the clean oil layer.

Any sand or other foreign material present in the incoming well stream will tend to settle upon the partition 14, and, because of the inclined walls of the partition, flow to and through the conductor 25 into the flume 24 for removal into the lower portion of the treating structure. In the event the conductor 25 should become obstructed or clogged for any reason, the liquid accumulating in the chamber 25 will overflow into the upper end of the flume 24 which projects a short distance above the partition 14, and hence, there will be avoided the possibility that the chamber 15 may fill with liquid so as to result in the loss of oil and other liquids through the gas outlet 20. Indeed, should this condition become extreme, there would be overflow into the upper end of the gas flume 36 which possibly could result in the passage of emulsion or dirty oil to the clean oil storage tanks, but in any event, would avoid the loss of the oil or the passage of the oil into the gas outlet pipe.

As stated hereinbefore, all of the partitions and surfaces in the structure are either vertical or sharply inclined so that the tendency for sand or other foreign matter to settle and accumulate thereon is substantially eliminated. All of the sand or other foregin material eventually settles into the cone-shaped bottom 12 of the vessel for removal through the pipe 45 as hereinbefore described.

A slightly modified form of the invention is illustrated in FIG. 4 of the drawings in which a condensing unit is provided at the upper end of the gas flume 36'. This form of the invention is substantially the same in all respects of structure and operation as the form of the invention first described with the exception that there is provided within the preliminary gas separation chamber 15 a tube and shell type of condenser 49 having a well stream inlet conductor 50 extending through the wall of the chamber 15 and being joined by a readily disconnectable coupling 51 into the tube side of the condenser 49. A well stream outlet conductor 52 is connected from the opposite end of the tube side flow path of the condenser through a second readily disconnectable coupling 53 into the diverter box 17 for discharge of the incoming well stream tangentially and circumferentially of the interior of the chamber 15.

The upper end of the gas flume 36' is joined by a conductor 54 and readily disconnectable coupling 55 into the shell side of the condenser 49, and a pair of gas and vapor outlet pipes 56 lead from the upper portion of the shell side of the condenser into the upper part of the chamber 15.

With this structure, the incoming well stream, which is relatively cool in comparison to the other fluids present within the emulsion treater, is passed through the condenser 49 for cooling the same, the outer walls of the condenser also being exposed to the relatively cool gases within the chamber 15 for additional chilling effect. The warm gases and vapors collected by the inverted baffle 35 are conducted upwardly through the flume 36' and conductor 54 into the shell side of the condenser 49 for intimate and dispersed heat exchange with the incoming well stream whereby efficient and effective condensation of evolved vapors is obtained. The condensates, of course, drain downwardly through the flume 36' into the intermediate portion of the treating vessel for separation and stratification into their water and liquid hydrocarbon components, the liquid hydrocarbons passing upwardly into the clean oil layer for increasing the gravity as well as the volume thereof and consequently the market value of the recovered clean oil.

This modified form of the invention has the advantage over the first described form of the invention of providing additional condensing surfaces for evolved gases and vapors and for thereby providing the desirable result of increasing the gravity and volume of the recovered oil to an optimum extent.

One or more covered manways 57 may be provided to open into the chamber 15 for access to the condenser 49 in order that the latter may be removed if desired for cleaning or replacement. Further, a gas equalizer pipe 58 extends upwardly into the chamber 15 through the partition 14 for the passage of evolved vapors to the gas outlet 20.

In the first two forms of the invention which have been described, the separated water is removed from the lower portion of the emulsion-treating vessel at a point immediately above the cone-shaped bottom 12, removal being effected through a conventional water siphon or water leg 59 as is conventional in the emulsion treating art. At times, however, it is desirable to remove the water from the disclosed structure through the lowermost portion thereof so as to remove at the same time sand or other foreign material which has settled into the lower portion of the cone bottom 12. A further modification of the invention is illustrated in FIG. 7 for carrying out this function, this modification including an elongate float chamber 60 connected into the treating vessel at suitable points exposed to the vapor space thereof and the body of separated water as, for example, immediately below the partition 14 and immediately above the cone bottom 12. A float 61 disposed at a suitable elevation within the chamber 60 operates a pilot valve 62, which, in turn, operates a diaphragm or motor operated outlet valve 63 disposed within the water outlet conductor 64 extending from the lower end of the cone bottom 12. Thus, as water accumulates within the vessel and raises the liquid level within the float chamber 60, the float 61 will be elevated to open the pilot valve 62 and actuate the outlet valve 63 whereby both water and sand or other foreign material are discharged from the lowermost portion of the treating vessel in accordance with their rates of accumulation. This structure has the benefit of removing the sand or foreign material at substantially its rate of accumulation and hence avoids the possibility of sand compacting within or clogging the lower portion or drain outlet of the cone bottom 12.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An emulsion treater for petroleum well streams containing foreign matter such as sand including, an emulsion treating vessel, upright walls forming a vertically extending heating space open at the top and bottom in the vessel, heating means in the heating space, upright walls disposed laterally outwardly of the heating space walls and defining with said vessel a retention chamber substantially completely surrounding the heating space, the retention chamber walls and the heating space walls defining between themselves a flow space open at the top and bottom on each side of the heating space, the flow space extending from the upper portion of the heating space into the lower portion of the emulsion treater vessel, conductor means for conducting at least the liquid portion of the well stream to the retention chamber, means including said conductor means cooperating with all said upright walls for flowing emulsion upwardly through the heating space and liquid and foreign matter downwardly through said flow space, a liquid outlet from the retention chamber to the heating space, and water, gas and clean oil outlets from the vessel.

2. An emulsion treater as set forth in claim 1 including a pair of opposed and downwardly and outwardly inclined baffles in the vessel overlying the heating space whereby fluids passing upwardly through the heating space are trapped by the overlying baffles and water and foreign matter are directed by said baffles into the flow space and away from said heating means.

3. An emulsion treater for petroleum well streams containing foreign matter such as sand comprising; an emulsion treating vessel; a plurality of laterally spaced vertically extending upright walls in said vessel; a vertically extending heating space in said vessel; a vertically extending retention chamber in said vessel; a vertically extending flow space in said vessel; said retention chamber completely surrounding said heating space; vertically extending upright means including said vertically extending walls for forming and laterally spacing said heating space, said flow space and said retention chamber; heating means in said heating space; said heating space and said flow space being open at the top and bottom and said flow space extending from the upper portion of the heating space into the lower portion of the emulsion treater vessel; conductor means for conducting at least the liquid portion of the well stream to the retention chamber; means including said conductor means cooperating with said upright walls for flowing emulsion upwardly through the heating space and liquid and foreign matter downwardly through said flow space; a liquid outlet from the retention chamber to the heating space, and water, gas and clean oil outlets from the vessel.

References Cited in the file of this patent

UNITED STATES PATENTS

| | | |
|---|---|---|
| 2,181,688 | Walker | Nov. 28, 1939 |
| 2,256,695 | Walker | Sept. 23, 1941 |
| 2,528,032 | Chandler et al. | Oct. 31, 1950 |
| 2,610,698 | Lovelady et al. | Sept. 16, 1952 |
| 2,614,649 | Walker et al. | Oct. 27, 1952 |
| 2,685,938 | Walker et al. | Aug. 10, 1954 |
| 2,726,729 | Williams | Dec. 13, 1955 |
| 2,751,998 | Glasgow | June 26, 1956 |
| 2,783,854 | Lovelady et al. | Mar. 5, 1957 |
| 2,808,123 | Walker et al. | Oct. 1, 1957 |
| 2,868,312 | Erwin | Jan. 13, 1959 |
| 2,939,544 | Walker et al. | June 7, 1960 |
| 2,948,352 | Walker et al. | Aug. 9, 1960 |